Nov. 10, 1970   J. A. LUCEY   3,539,764
GAS SHIELDED ELECTRIC ARC WELDING
Filed Dec. 13, 1965
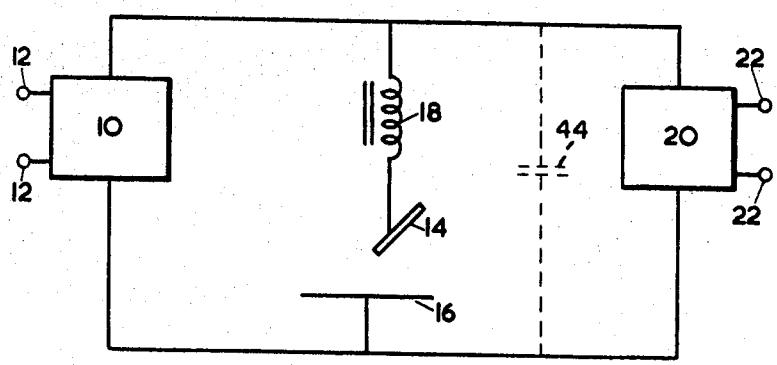
INVENTOR
JOHN ANTHONY LUCEY
BY Townshend & Meserole
ATTORNEYS

United States Patent Office 3,539,764
Patented Nov. 10, 1970

3,539,764
GAS SHIELDED ELECTRIC ARC WELDING
John A. Lucey, Chalfont St. Peter, England, assignor to The British Oxygen Company Limited, a British company
Filed Dec. 13, 1965, Ser. No. 513,498
Claims priority, application Great Britain, Dec. 15, 1964, 51,092/64
Int. Cl. B23k 9/00
U.S. Cl. 219—137
3 Claims

ABSTRACT OF THE DISCLOSURE

In a dip transfer welding process in which molten electrode material is drawn off by the electrode dipping into the weld pool and short-circuiting the arc the power supplied to the electrode is cycled between two different and distinct levels. At the higher level an arc free from short-circuits is preferably produced, but at the lower level the arc melts the electrode at a speed lower than its feed rate, so that evenually it comes into short-circuiting contact with the weld pool.

---

This invention relates to gas shielded electric arc welding using a consumable electrode which is fed continuously to the welding point, i.e., MIG welding, and more broadly to electric arc welding using a continuously fed consumable electrode in a gaseous atmosphere.

A well known MIG welding process at the present time is that using a short-circuiting arc. In this process, which is described for example in U.K. patent specification No. 901,333, a welding power supply having particular characteristics is used to supply welding current under conditions which in every second produce a sequence of arc periods alternating with periods of short circuit between the electrode wire and the weld pool. One of the conditions required is that the current available from the power supply during arcing should be insufficient to match the electrode feed speed, thus causing a shortening of the arc length until the electrode short circuits to the workpiece. Transfer of weld metal from the electrode to the weld pool takes place for all practical purposes only during the short circuit periods.

One requirement of the power supply is that it should be able to apply a steady voltage between electrode and workpiece which is less than that required to produce a welding arc free from short circuits under the particular welding conditions, and a further requirement is that the current should be sufficient to melt off the electrode tip under short circuit conditions but should not rise to such a magnitude or at such a rate that excessive spatter is produced as the arc is reestablished. The welding circuit also includes inductive or capacitive reactance arranged to store energy during short circuit periods and arranged to superimpose a voltage on the low steady voltage to sustain the arc for a limited time before each short-circuiting period.

One limitation of short-circuiting arc MIG welding with presently available apparatus is that the frequency of short circuits tends to be irregular. This may cause a variable heat input to the welding zone, and in some circumstances cause weld defects due to lack of fusion.

A further disadvantage is that the electrode diameter must be limited if excessive spatter is to be avoided. Thus in December 1964 1/16 inch diameter steel wire was the largest diameter wire used for this process, particularly when welding in the vertical or overhead positions.

Yet another disadvantage is that the maximum voltage at which the process will operate satisfactorily without excessive spatter is also limited. In consequence the heat input to the weld in relation to the deposition rate is limited, and this may result in the occurrence of defects due to lack of fusion when welding thick plates, for example plates of more than 3/8 inch thickness.

It is another object of the present invention to overcome some or all of these limitations.

According to the present invention, in an electric arc welding process of the kind in which a consumable electrode is fed continuously to a welding point during welding, which takes place in a gaseous atmosphere, under conditions which in every second produce a sequence of arcing periods alternatnng with periods of short circuit between the consumable electrode and the workpiece, the voltage applied between the consumable electrode and the workpiece is derived from a power supply whose output voltage can vary at a predetermined frequency between relatively low and relatively high values, and wherein the varying output voltage is applied between the consumable electrode and workpiece with the relatively high value occurring at some time during each arc period, whereby the transfer of metal is determined by the predetermined frequency.

The low voltage is generally of the same order, or less than, that normally used in the known short-circuiting process, namely 15 to 36 volts, and is less than that required to produce a welding arc free from short circuits under the particular welding conditions.

The high voltage will exceed the voltage used in the known short-circuiting process under the same conditions, and with the same rate of wire feed, and will generally be more than 30 volts. Preferably, but not necessarily, the high voltage should produce a welding arc free from short circuits under the particular welding conditions.

Metal transfer should not be by free flight from electrode to weld pool. It appears that in operation of the invention a relatively large molten metal globule forms on the electrode tip during the high voltage period and flows into the weld pool during the short circuit.

In the known short-circuiting process a relatively large short-circuiting current is required to assist in melting and also to sever the metal globule from the electrode tip. This mode of operation is also possible with the present invention but it is also possible to set the conditions such that the short circuit current does not need to assist melting of the metal globule, and in this case there need be no appreciable rise in the value of welding current as a result of the short circuits. This is ensured if the instantaneous value of welding current is determined by the power supply independently of short circuits occurring between the consumable electrode and the workpiece. Thus the power supply used may have a current output that is limited at the instant of short circuit. An example suitable for the present invention is a power supply having a drooping volt-ampere characteristic such that the short circuit current is approximately 20% more than the arcing current.

The voltage applied between electrode and weld pool may be applied alternately from a low voltage power supply and a high voltage power supply, the changeover being effected at the predetermined frequency. Alternatively the low voltage may be applied continuously and a voltage may be superimposed thereon to produce the high voltage when required.

The operation of the invention is affected by the particular gaseous atmosphere surrounding the weld pool and electrode tip. For preferred operation when welding steel with a conventionally deoxidised electrode wire we have found it best to use argon as shielding gas to exclude the atmosphere from the weld pool and electrode tip. In argon it appears that certain forces in the arc, believed to be plasma jets, force the molten globule on the electrode tip towards the weld pool during the arcing period. This has the effect of advancing the instant of short circuit, and conditions can be set so that short circuits occur once or more during the high voltage period and/or once during a low voltage period, or once every two or three periods, for example, although always in a repeated pattern.

Other monatomic gases such as helium appear to produce a similar effect on the metal transfer when they constitute the arc atmosphere, and mainly monatomic gas mixtures including upwards of 80% argon or helium may be used. A relatively small proportion of oxygen may be added to reduce surface tension of the molten metal and improve the shape of the deposited weld bead.

In carrying out the process of the invention it should be borne in mind that the arc length should be short enough for this phenomenon of repeated short circuiting to occur. Somewhat greater arc lengths can be tolerated, however, than have been obtained in the known short-circuiting process. The arc length is a function of the droplet size and hence of the electrode diameter. It is also a function of the mean voltage and of the mean current or wire feed speed. With a constant wire feed speed the arc length is therefore a function of the mean voltage and mean current. Presuming a pulsed high voltage level (and current level) of the power supply output and a mean voltage and current level determined by the conditions required, a low value of the low voltage (and current) of the power supply may cause a short circuit to occur before the peak of the high voltage pulse. Lowering of the pulse current and raising of the low current, so as to keep the same mean value, will delay the instant of short circuit.

At any given frequency with a particular size of electrode wire, the current during the arcing period should be sufficient to produce on the electrode tip a molten globule large enough to short circuit the electrode to the weld pool as the plasma jet forces elongate this globule towards the weld pool.

Somewhat different are forces appear to act when the welding arc exists in a diatomic gas atmosphere such as carbon dioxide, or air, or nitrogen (which may be used as shielding gas where a copper electrode is being used to weld a copper workpiece). In such cases the molten globule appears to repelled from the weld pool so long as the high voltage is applied during the arcing period. With such an atmosphere it is necessary to arrange that the molten globule builds up in size during the arcing period, whilst the high voltage is applied from the power supply, but does not detach from the electrode tip. The subsequent application of the low voltage—which is insufficient to sustain a continous welding arc under these conditions—removes the repellent force and permits the globule to bridge the gap between the weld pool and electrode tip, and then flow to the weld pool. With diatomic gases it is therefore possible to obtain only one short circuit for every sequence of high and low voltage pulses applied from the power supply.

By use of the invention it has been found possible for the first time to make satisfactory welds in the vertical position using a flux cored steel sheathed tubular electrode of $3/32$ inch diameter in an argon shield.

Indeed it appears that a greater tolerance to variation of arc length occurs if a tubular electrode having a less electrically conductive core than sheath is used instead of a solid wire in the process of the present invention. This is believed to be due to the presence during arcing of a projection of core material extending beyond the edge of the sheath. The arc roots at this edge rather than on the less conductive projection, and the projection provides a guide along which molten metal from the sheath can flow towards the weld pool. Burning back or melting off of the projection of core material does occur either continuously or intermittently but a guide for molten metal from the sheath is provided during at least a proportion of the welding operation.

According to one example of flux cored steel sheathed tubular electrode of $3/32$ inch diameter was used in the process of the present invention in an atmosphere of argon. The core consisted mainly of slag forming materials compacted within the sheath and having an electrical conductivity less than that of the sheath. The electrode was fed toward the steel workpiece at a constant speed of 65 inches per minute and current was supplied alternately, and for periods of similar duration, from a low voltage power source and a high voltage power source, switching being effected at 50 cycles per second. The average welding current was 215 amperes, and the average arc voltage was 21.5 volts. The open circuit voltages of the two power sources were 53 volts and 28 volts respectively.

In another example, using $3/64$ inch diameter solid steel wire fed at a speed of 86 inches per minute, and shrouded in argon gas, the average weld current was 105 amperes, with peak values of 175 amperes during the pulse period and 275 amperes during short circuit. In this example the open circuit voltages of the two power sources were 53 and 18 volts respectively, and the mean arc voltage was 15 volts. The switching frequency was again 50 cycles per second.

Satisfactory welds were obtained using the conditions set out in these examples. In making these and other welds it was apparent from oscillographic records that the switching of the voltage applied between the electrode and workpiece was forcing the short circuits to occur relatively regularly. These regular short circuits would generally occur at switching frequency, but under different conditions could be forced to occur at a harmonic or subharmonic frequency. It is also possible to achieve a regularly repeated pattern, for example two short circuits in the high voltage period and a single short circuit in the low voltage period. This is in contrast to the somewhat random natural occurrence and duration of short circuits in the known process, and produced a more constant input of heat to the welding zone. It was further noted that the heat input to the welding zone was increased as compared with the known process as a result of the application of the high voltage between the electrode and workpiece. This enabled electrodes of larger diameter to be used without producing excessive spatter, and also enables steel plates of more than $3/8$ inch thickness to be welded with less susceptibility to defects due to lack of fusion. Several weld runs along the seam were, of course, needed when welding thicker plates.

It will be appreciated that many different methods can be employed to produce a variable voltage supply at a selected frequency for operating the invention.

One particular arrangement which has merits in that it is both simple and effective for operation with conventional semiautomatic and fully automatic MIG welding equipment is illustrated in the accompanying drawing which is described more fully in our copending U.K. patent application No. 32,023/64, to which reference is invited.

In the single figure of the drawing, a primary power supply 10 is connected by terminals 12 to three-phase alternating current mains. The power supply comprises a transformer-rectifier having a flat or slightly drooping voltage current output characteristic and is adapted to apply a low direct voltage between the consumable electrode 14 of a MIG welding apparatus and a workpiece 16 to be welded. An inductance 18 is placed in series with the arc gap. This inductance may take the form of an iron cored coke with a small air gap, and may have a value of 10–100mH.

A secondary power supply 20 is connected in parallel with the primary power supply 10 across the series arrangement of inductance 18 and arc gap. Supply 20 includes a pulse generator and is adapted to produce pulses of direct welding current at a predetermined frequency, say, 50, 60, 100 or 120 cycles per second, and to cause the required high voltage to be applied between electrode and workpiece. In operation, when a pulse of welding current is produced by supply 20, the supply 10 is reverse-biased by the higher voltage from supply 20 and supplies no welding current. However, as the pulse voltage falls to a low value, before being removed altogether, the supply 10 again applies its output voltage between electrode 14 and workpiece 16.

Alternatively a separate choke may be connected in series with each power supply, each choke being of such value as to limit the short circuit current to an acceptable level.

Other power supply arrangements suitable for use in carrying out the process of the present invention are the single-phase arrangements described in our copending U.K. patent application No. 13,670/65.

I claim:

1. An electric arc welding process of the kind in which a consumable electrode is fed continuously to a welding point during welding, which takes place in a gaseous atmosphere, under conditions which in every second produce a sequence of arcing periods alternating with periods of short circuiting contact between the consumable electrode and the workpiece, wherein the voltage applied between the consumable electrode and the workpiece varies at a predetermined frequency between relatively low and relatively high values, and wherein the varying output voltage is applied between the consumable electrode and workpiece alternately from a low voltage power supply and a high voltage power supply, the changeover being effected at the predetermined frequency so that the voltage reaches its higher level at some time during each arcing period, whereby the transfer of metal from the electrode to the workpiece is a function of the frequency of variation.

2. An electric arc welding process as claimer in claim 1, wherein the workpiece is a steel plate of more than three-eights inch thickness.

3. An electric arc welding process as claimed in claim 2, wherein the diameter of the electrode wire is greater than one-sixteenth of an inch.

References Cited

UNITED STATES PATENTS

| | | | |
|---|---|---|---|
| 2,909,778 | 10/1959 | Landis et al. | 219—146 |
| 3,117,215 | 1/1964 | Ramsey | 219—131 X |
| 3,130,295 | 4/1964 | Manz | 219—131 |
| 3,253,120 | 5/1966 | Claussen | 219—74 X |
| 3,275,797 | 9/1966 | Manz | 219—137 |
| 2,922,871 | 1/1960 | Hackman et al. | 219—131 |
| 2,993,984 | 7/1961 | Sullivan | 219—131 |
| 3,030,495 | 4/1962 | Anderson | 219—131 |
| 3,249,735 | 5/1966 | Needham | 219—131 |
| 3,365,564 | 1/1968 | Boughton | 219—131 |

OTHER REFERENCES

McElrath: Welding Journal, "Short-arc Consumable-Electrode Welding Applications and New Developments," pp. 1044–1050, October 1960.

ANTHONY BARTIS, Primary Examiner

C. L. ALBRITTON, Assistant Examiner

U.S. Cl. X.R.

219—130, 131